(12) United States Patent  (10) Patent No.: US 12,148,105 B2
Aitbayev et al.  (45) Date of Patent: Nov. 19, 2024

(54) SURFACE NORMALS FOR PIXEL-ALIGNED OBJECT

(71) Applicant: Snap Inc., Santa Monica, CA (US)

(72) Inventors: Madiyar Aitbayev, London (GB); Brian Fulkerson, London (GB); Riza Alp Guler, London (GB); Georgios Papandreou, London (GB); Himmy Tam, London (GB)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 17/841,994

(22) Filed: Jun. 16, 2022

(65) Prior Publication Data

US 2023/0316665 A1  Oct. 5, 2023

(30) Foreign Application Priority Data

Mar. 30, 2022 (GR) ................................ 0220100284

(51) Int. Cl.
 *G06T 19/00*  (2011.01)
 *G06T 7/11*  (2017.01)
 (Continued)

(52) U.S. Cl.
 CPC .............. *G06T 19/006* (2013.01); *G06T 7/11* (2017.01); *G06T 7/194* (2017.01); *G06T 7/70* (2017.01);
 (Continued)

(58) Field of Classification Search
 CPC ......... G06T 19/006; G06T 7/194; G06T 7/11; G06T 7/70
 (Continued)

(56) References Cited

U.S. PATENT DOCUMENTS 5,604,843 A   2/1997  Shaw et al.
5,689,559 A  11/1997  Park
            (Continued)

FOREIGN PATENT DOCUMENTS

CN  109863532 A  6/2019
CN  110168478 A  8/2019
            (Continued)

OTHER PUBLICATIONS

U.S. Appl. No. 18/078,547, filed Dec. 9, 2022.
(Continued)

*Primary Examiner* — Thomas J Lett
(74) *Attorney, Agent, or Firm* — SCHWEGMAN LUNDBERG & WOESSNER, P.A.

(57) ABSTRACT

Methods and systems are disclosed for performing operations for applying augmented reality elements to a person depicted in an image. The operations include receiving an image that includes data representing a depiction of a person; generating a segmentation of the data representing the person depicted in the image; extracting a portion of the image corresponding to the segmentation of the data representing the person depicted in the image; applying a machine learning model to the portion of the image to predict a surface normal tensor for the data representing the depiction of the person, the surface normal tensor representing surface normals of each pixel within the portion of the image; and applying one or more augmented reality (AR) elements to the image based on the surface normal tensor.

20 Claims, 11 Drawing Sheets

(51) Int. Cl.
  *G06T 7/194* (2017.01)
  *G06T 7/70* (2017.01)
  *G06T 15/50* (2011.01)
  *G06T 15/60* (2006.01)
  *G06T 19/20* (2011.01)

(52) U.S. Cl.
  CPC ............ *G06T 15/506* (2013.01); *G06T 15/60* (2013.01); *G06T 19/20* (2013.01); *G06T 2200/08* (2013.01); *G06T 2207/10016* (2013.01); *G06T 2207/20021* (2013.01); *G06T 2207/20081* (2013.01); *G06T 2207/20084* (2013.01); *G06T 2207/30196* (2013.01); *G06T 2210/16* (2013.01); *G06T 2219/2012* (2013.01)

(58) Field of Classification Search
  USPC ........................................................ 345/426
  See application file for complete search history.

(56) References Cited

U.S. PATENT DOCUMENTS

| | | |
|---|---|---|
| 5,880,731 A | 3/1999 | Liles et al. |
| 6,023,270 A | 2/2000 | Brush, II, et al. |
| RE36,919 E | 10/2000 | Park |
| RE37,052 E | 2/2001 | Park |
| 6,223,165 B1 | 4/2001 | Lauffer |
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,762,174 B2 | 9/2020 | Denton et al. |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,030,789 B2 | 6/2021 | Chand et al. |
| 11,036,781 B1 | 6/2021 | Baril et al. |
| 11,063,891 B2 | 7/2021 | Voss |
| 11,069,103 B1 | 7/2021 | Blackstock et al. |
| 11,080,917 B2 | 8/2021 | Monroy-Hernández et al. |

(56) References Cited

U.S. PATENT DOCUMENTS

| | | |
|---|---|---|
| 11,128,586 B2 | 9/2021 | Al Majid et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-Hernández et al. |
| 11,284,144 B2 | 3/2022 | Kotsopoulos et al. |
| 11,567,324 B2 * | 1/2023 | Kimmel ............. G02B 27/0081 |
| 11,734,795 B2 * | 8/2023 | Su ......................... G06T 3/4038 |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2015/0243035 A1 | 8/2015 | Narasimha et al. |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0198743 A1 | 7/2018 | Blackstock et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057515 A1 | 2/2019 | Teixeira et al. |
| 2019/0057616 A1 | 2/2019 | Cohen et al. |
| 2019/0097958 A1 | 3/2019 | Collet et al. |
| 2019/0116322 A1 | 4/2019 | Holzer et al. |
| 2019/0188920 A1 | 6/2019 | Mcphee et al. |
| 2019/0280997 A1 | 9/2019 | Baldwin et al. |
| 2020/0306637 A1 | 10/2020 | Baldwin et al. |
| 2020/0372127 A1 | 11/2020 | Denton et al. |
| 2020/0410575 A1 | 12/2020 | Grantham et al. |
| 2021/0065448 A1 | 3/2021 | Goodrich et al. |
| 2021/0074047 A1 | 3/2021 | Sheth et al. |
| 2021/0089179 A1 | 3/2021 | Grantham et al. |
| 2021/0104087 A1 | 4/2021 | Smith et al. |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0306290 A1 | 9/2021 | Voss |
| 2021/0306451 A1 | 9/2021 | Heikkinen et al. |
| 2021/0358123 A1 | 11/2021 | Kearney et al. |
| 2021/0358212 A1 | 11/2021 | Vesdapunt et al. |
| 2021/0385180 A1 | 12/2021 | Al Majid et al. |
| 2021/0405831 A1 | 12/2021 | Mourkogiannis et al. |
| 2021/0409535 A1 | 12/2021 | Mourkogiannis et al. |
| 2022/0012929 A1 | 1/2022 | Blackstock et al. |
| 2022/0292699 A1 | 9/2022 | Zhu et al. |
| 2023/0316666 A1 | 10/2023 | Aitbayev et al. |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2020171907 A1 | 8/2020 |
| WO | 2023192426 | 10/2023 |
| WO | 2023196387 | 10/2023 |

OTHER PUBLICATIONS

U.S. Appl. No. 17/842,006, filed Jun. 16, 2022.
"International Application Serial No. PCT/US2023/016813, Invitation to Pay Additional Fees dated Jul. 13, 2023", 12 pgs.
"International Application Serial No. PCT/US2023/017550, International Search Report dated Aug. 3, 2023", 4 pgs.
"International Application Serial No. PCT/US2023/017550, Written Opinion dated Aug. 3, 2023", 10 pgs.
"International Application Serial No. PCT/US2023/016813, International Search Report dated Sep. 4, 2023", 7 pgs.
"International Application Serial No. PCT/US2023/016813, Written Opinion dated Sep. 4, 2023", 11 pgs.
Chen, Weifeng, "Surface Normais In the Wild", Arxiv.Org, Cornell University Library, 201 Olin Library Cornell University Ithaca, NY 14853, (Apr. 10, 2017), 12 pgs.
Jafarian, Yasamin, "Learning High Fidelity Depths of Dressed Humans by Watching Social Media Dance Videos", IEEE CVR

(56) References Cited

OTHER PUBLICATIONS

Conference On Computer Vision and Pattern Recognition (CVPR), IEEE, (Jun. 20, 2021), 10 pgs.

Pandey, Rohit, "Total relighting", Acm Transactions On Graphics, ACM, NY, US, vol. 40, No. 4, (Jul. 19, 2021), 1-21.

Trigeorgis, George, "Face Normals "In-the-Wild" Using Fully Convolutional Networks", IEEE Conference On Computer Vision and Pattern Recognition (CVPR), IEEE Computer Society, US, (Jul. 21, 2017), 10 pgs.

Wong, Hallee, "Markerless Augmented Advertising for Sports Videos", Advances in Databases and Information Systems; [Lecture Notes in Computer Science; Lect.Notes Computer], Springer International Publishing, Cham, XP047512803, (Jun. 19, 2019), 494-509.

Zhen, Jianan, "SMAP: Single-Shot Multi-Person Absolute 3D Pose Estimation", arxiv.org, Cornell University Library, 201 Olin Library Cornell University Ithaca, NY 14853, XP081748775, (Aug. 26, 2020), 20 pgs.

"U.S. Appl. No. 17/842,006, Non Final Office Action mailed Mar. 21, 2024", 33 pgs.

"Bitmoji", Snapchat Support, [Online] Retrieved from the Internet: <URL: https://web.archive.org/web/20190503063620/https://support.snapchat.com/en-us/a/bitmoji>, (captured May 3, 2019), 2 pgs.

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.

"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

"International Application Serial No. PCT/US2023/082328, International Search Report mailed Mar. 5, 2024", 3 pgs.

"International Application Serial No. PCT/US2023/082328, Written Opinion mailed Mar. 5, 2024", 7 pgs.

"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.

MacMillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Reign, Ashley, "How To Add My Friend's Bitmoji To My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Tumbokon, Karen, "Snapchat Update: How To Add Bitmoji To Customizable Geofilters", International Business Times, [Online] Retrieved from the Internet : <URL: https://www.ibtimes.com/snapchat-update-how-add-bitmoji-customizable-geofilters-2448152>, (Nov. 18, 2016), 6 pgs.

U.S. Appl. No. 17/842,006, Final Office Action mailed Sep. 3, 2024, 36 pgs.

\* cited by examiner

SURFACE NORMALS FOR PIXEL-ALIGNED OBJECT

CLAIM OF PRIORITY

This application claims the benefit of priority to Greece Patent Application Serial No. 20220100284, filed Mar. 30, 2022, which is incorporated herein by reference in its entirety.

TECHNICAL FIELD

The present disclosure relates generally to providing augmented reality experiences using a messaging application.

BACKGROUND

Augmented Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
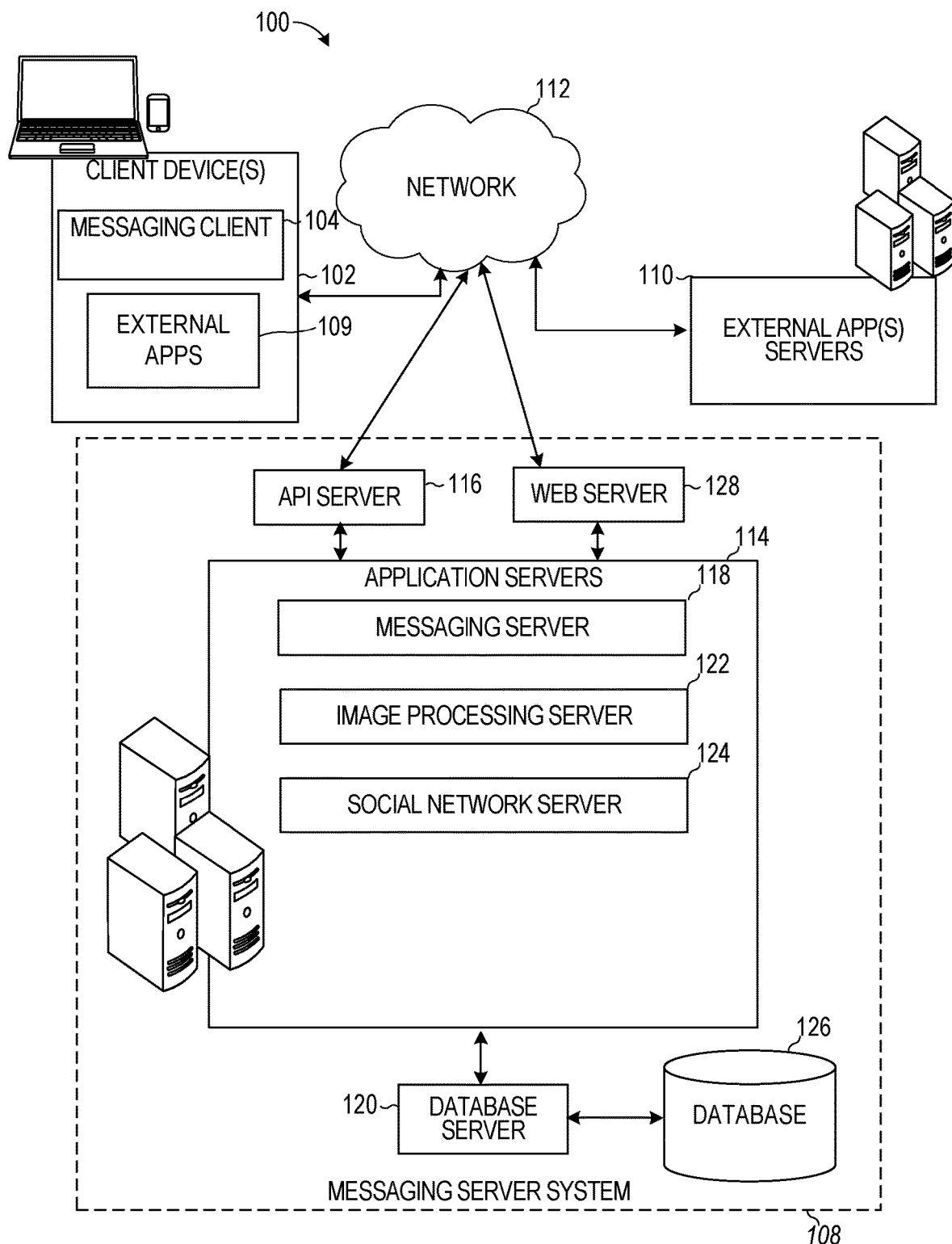
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, VR and AR systems display images representing a given real-world object, such as a user, by capturing an image of the object and, in addition, obtaining a depth map using a depth sensor of the real-world object depicted in the image. By processing the depth map and the image together, the VR and AR systems can detect positioning of a object in the image and can appropriately modify the object or background in the images. While such systems work well, the need for a depth sensor limits the scope of their applications. This is because adding depth sensors to user devices for the purpose of modifying images increases the overall cost and complexity of the devices, making them less attractive.

Certain systems do away with the need to use depth sensors to modify images. For example, certain systems allow users to replace a background in a videoconference in which a face of the user is detected. Specifically, such systems can use specialized techniques that are optimized for recognizing a portion of the object, such as the face of a user, to identify the background in the images that depict the portion of the object (e.g., the user's face). These systems can then replace only those pixels that depict the background so that the real-world background is replaced with an alternate background in the images. Such systems though are generally incapable of recognizing the entirety of the object, such as a whole body of a user. As such, if the object is more than a threshold distance from the camera such that more than just the portion object (e.g., the face of the user) is captured by the camera, the replacement of the background with an alternate background begins to fail. In such cases, the image quality is severely impacted, and portions of the object (e.g., face and body of the user) can be inadvertently removed by the system as the system falsely identifies such portions as belonging to the background rather than the foreground of the images.

These types of systems also fail to properly replace the background when more than one object is depicted in the image or video feed. Because such systems are generally incapable of distinguishing the entirety of the object from a background, these systems are also unable to apply visual effects to certain portions of the object. For example, systems that identify the face of a user may fail to apply visual effects to other portions of the user, such as the user's body, articles of clothing, and the like.

The disclosed techniques improve the efficiency of using the electronic device by cropping out a portion of an image or video depicting a an object (e.g., body of a person) in the image or video and applying a machine learning model to the cropped out object to estimate both a segmentation of the object and a surface normal tensor. The surface normal tensor can represent the surface normal of each pixel that is part of the segmentation of the object depicted in the image. This enables the disclosed systems to apply one or more AR effects only to the object (e.g., body of a person) depicted in the image without affecting the background. As a result, a more realistic display of the AR effects can be provided to the user which significantly improves the illusion that such AR effects are part of the real-world environment.

In some examples, the surface normals of the pixels of the object are computed or provided relative to a camera or surface normal of the camera used to capture the image or video. In some examples, the disclosed techniques can change lighting effects and reflections on the object, such as by adding effects to a human body and/or fashion items or garments worn by the human body. The AR effects can be applied based on a geometry of the object, such as a body of the person, hair of the person, clothing of the person, and/or one or more accessories worn by the person. In some examples, artificial light can be applied to data representing the object depicted in the image based on the surface normal tensor. In such cases, the surface normal tensor provides information about details of the object, such as wrinkles of skin or fashion items worn by the person to modify the shadows and/or reflections of the artificial light in a realistic manner. For example, a portion of the one or more AR elements that overlays the one or more wrinkles can be bent based on the surface normal tensor. In some examples, two AR elements, such as 3D columns, can be generated to extend from respective pixels along respective directions of surface normals of such pixels.

This improves the overall experience of the user in using the electronic device. Also, by performing such segmentations without using a depth sensor, the overall amount of system resources needed to accomplish a task is reduced.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications, such as external apps 109 using Application Programming Interfaces (APIs).

The client device 102 may operate as a standalone device or may be coupled (e.g., networked) to other machines. In a networked deployment, the client device 102 may operate in the capacity of a server machine or a client machine in a server-client network environment, or as a peer machine in a peer-to-peer (or distributed) network environment. The client device 102 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the disclosed operations. Further, while only a single client device 102 is illustrated, the term "client device" shall also be taken to include a collection of machines that individually or jointly execute the disclosed operations.

In some examples, the client device 102 can include AR glasses or an AR headset in which virtual content or AR/VR element(s) is/are displayed within lenses of the glasses while a user views a real-world environment through the lenses. For example, an image can be presented on a transparent display that allows a user to simultaneously view virtual content presented on the display and real-world objects.

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration; login functionality; the sending of messages, via the application servers 114, from a particular messaging client 104 to another messaging client 104; the sending of media files (e.g., images or video) from a messaging client 104 to a messaging server 118, and for possible access by another messaging client 104; the settings of a collection of media data (e.g., story); the retrieval of a list of friends of a user of a client device 102; the retrieval of such collections; the retrieval of messages and content; the addition and deletion of entities (e.g., friends) to an entity graph (e.g., a social graph); the location of friends within a social graph; and opening an application event (e.g., relating to the messaging client 104).

The application servers 114 host a number of server applications and subsystems, including, for example, a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
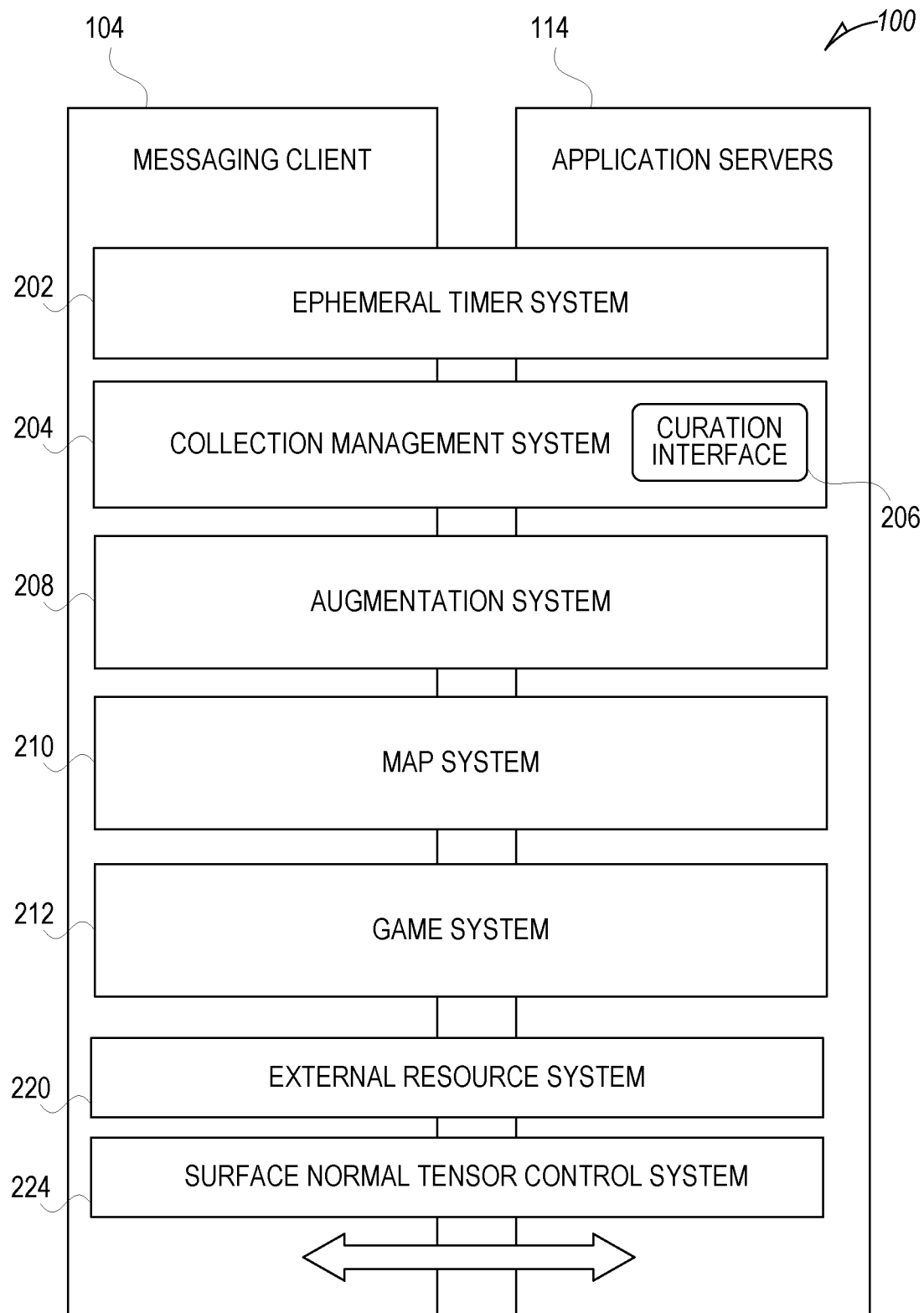
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more AR experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding AR experience or perform a desired image modification (e.g., replacing a garment being worn by a user in a video or recoloring the garment worn by the user in the video or modifying the garment based on a gesture performed by the user).

Figure 3:
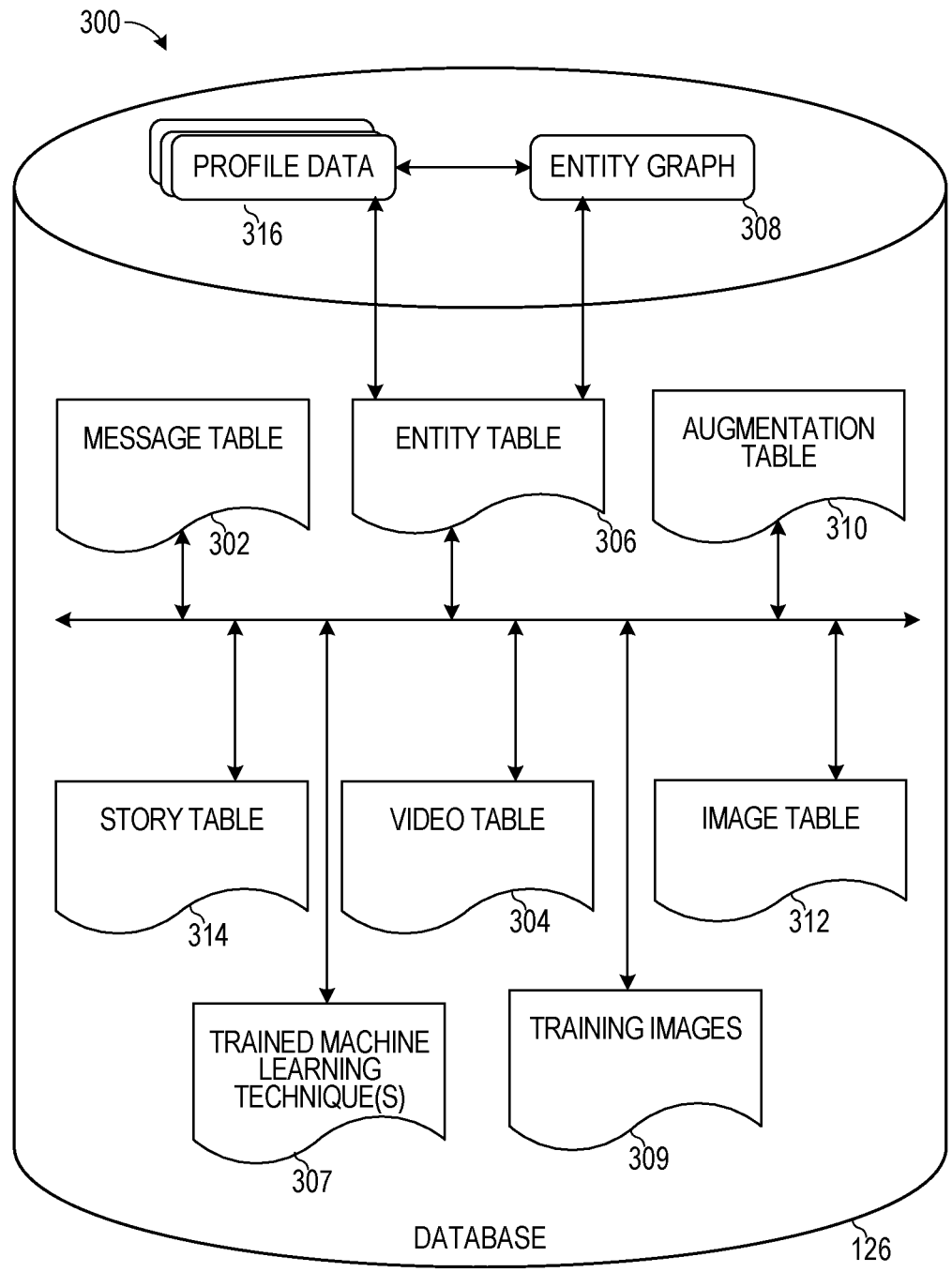
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*j s file or a j son file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

The messaging client 104 can present to a user one or more AR experiences that can be controlled and presented on a body of a person (or user) and/or an article of clothing, such as a shirt (fashion item or upper garment), worn by the person (or user) depicted in the image. As an example, the messaging client 104 can detect a person in an image or video captured by the client device 102. The messaging client 104 can crop a portion of the image depicting the person. The messaging client 104 can apply a machine learning model to the cropped portion to generate a segmentation of the body of the person depicted in the image and to generate a surface normal tensor for the body of the person. Using the surface normal tensor and the segmentation of the body, the messaging client 104 can apply one or more AR elements to the body and/or the article of clothing (or fashion item), such as a shirt, article of clothing, upper garment, fashion item, dress, pants, shorts, skirts, jackets, t-shirts, blouses, glasses, jewelry, a hat, ear muffs, and so forth, in the image or video.

For example, the surface normal tensor indicates an estimated angle of each pixel in the portion of the image corresponding to the body segmentation, such as relative to a camera used to capture the image (e.g., relative to a surface normal of the camera used to capture the image or video). This enables the messaging client 104 to present one or more AR elements on the body and/or clothing depicted in the image based on the surface normal tensor.

In some examples, the messaging client 104 can determine that light is being focused on a portion of the body of the depicted person from a first direction based on the surface normal tensor. In response, the messaging client 104 can modify pixel values of the portion of the body of the depicted person to re-focus the light on the body of the person from a second direction based on the surface normal tensor (e.g., the surface normals of each pixel that is in the portion of the body). Specifically, the messaging client 104 can determine that a first pixel in the portion of the image is pointing towards a given direction relative to the camera or surface normal of the camera. In such cases, the messaging client 104 can modify the first pixel to render a reflection of the re-focused light from the second direction towards the given direction.

For example, the light in the image depicting the person can be focused from a top of the image towards a bottom of the image. Namely, a spotlight can be presented above the person depicted in the image and can point downwards towards the floor depicted in the image. In such cases, the messaging client 104 can modify the pixel values to re-focus artificial light from the bottom towards the top. For example, the messaging client 104 can remove the spotlight or light coming from the top of the image depicting the person and can render a display of AR light originating from a floor depicted in the image. The messaging client 104 can control reflections off of a person depicted in the image based on the surface normal tensor of the body of the person. Specifically, the messaging client 104 can determine how light that is directed towards each given pixel of the person is reflected or absorbed based on the corresponding angle of each pixel relative to the camera and based on the angle of each pixel relative to the point of origin of the AR light. This creates a realistic illusion that light is originating from a bottom of the image as the manner of reflection and absorption of the light on the person depicted in the image is preserved.

In some examples, the messaging client 104 can generate a 3D graphic as the AR elements. The 3D graphic can be associated with a group of pixels having a certain quantity of pixels. For example, a group of pixels that are within a specified region (e.g., a square region or circular region having a certain size) can be associated with each 3D graphic. In such cases, the messaging client 104 can identify a first group of pixels that are within a first portion of the segmentation of the body of the person depicted in the image. The messaging client 104 can obtain the surface normal tensor for that first group of pixels and can generate an average surface normal that represents the average of the surface normals of the first group of pixels. The messaging client 104 can then retrieve the 3D graphic and align the 3D graphic on top of the first group of pixels and angle the 3D graphic along the average of the surface normals. This makes the 3D graphic appear to be extending from the first group of pixels corresponding to the first portion of the segmentation of the body of the person. The messaging client 104 can perform a similar operation for a second group of pixels that are within a second portion of the segmentation to generate a second 3D graphic for display on top of the second group of pixels. This process can be repeated until all of the pixel groups within the segmentation of the body are associated with respective 3D graphics.

The messaging client 104 continuously or periodically recomputes and re-estimates the surface normal tensor as new images or videos are received. Specifically, the messaging client 104 can track movement of the person depicted in the image or video across frames of the image or video. As the person moves, the messaging client 104 can recompute and re-estimate the surface normal tensor in the portion of the image corresponding to the depicted person. The messaging client 104 can continuously or periodically modify the AR elements presented on the person and specifically modify the way in which light is reflected or absorbed by the pixels corresponding to the person and the way in which shadows are generated based on changes to the surface normal tensor.

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain AR experiences and presents identifiers of such experiences in one or more user interfaces (e.g., as icons over a real-time image or video or as thumbnails or icons in interfaces dedicated for presented identifiers of AR experiences). Once an AR experience is selected, one or more images, videos, or AR graphical elements are retrieved and presented as an overlay on top of the images or video captured by the client device 102. In some cases, the camera is switched to a front-facing view (e.g., the front-facing camera of the client device 102 is activated in response to activation of a particular AR experience) and the images from the front-facing camera of the client device 102 start being displayed on the client device 102 instead of the rear-facing camera of the client device 102. The one or more images, videos, or AR graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions), and other payload data (e.g., text, audio, video, or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access the shared AR session. In some examples, the client devices 102 are able to access the shared AR session without aid or communication with the augmentation system 208 in the application servers 114.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104 and played with other users of the messaging system 100. The messaging system 100 further enables a particular user to invite other users to participate in the play of a specific game by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes APIs with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a graphical user interface of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional (2D) avatars of users with or without different avatar characteristics). As another example, external resources that include small-scale versions of external applications (e.g., web-based versions of third-party applications) are provided with access to a second type of user data (e.g., payment information, 2D avatars of users, three-dimensional (3D) avatars of users, and avatars with various avatar characteristics). Avatar characteristics include different ways to customize a look and feel of an avatar, such as different poses, facial features, clothing, and so forth.

A surface normal tensor control system 224 crops out portion of an image or video depicting a body of a person depicted in the image or video and applies a machine learning model (e.g., convolutional neural network or other artificial neural network) to the cropped out body to estimate both a segmentation of the body and a surface normal tensor. The surface normal tensor can represent the surface normal of each pixel that is part of the segmentation of the body depicted in the image. This enables the surface normal tensor control system 224 to apply one or more AR effects only to the body of the person depicted in the image without affecting the background. As a result, a more realistic display of the AR effects can be provided to the user which significantly improves the illusion that such AR effects are part of the real-world environment. An illustrative implementation of the surface normal tensor control system 224 is shown and described in connection with FIG. 5 below.

Specifically, the surface normal tensor control system 224 is a component that can be accessed by an AR/VR application implemented on the client device 102. The AR/VR application uses an RGB camera to capture a monocular image of a user or person and the garment or garments (alternatively referred to as fashion item(s)) worn by the user or person. The AR/VR application applies various trained machine learning techniques on the captured image of the person to generate or estimate the surface normal tensor for the pixels of the person and to apply one or more AR visual effects to the portions of the image that depict the person without modifying other portions of the image that do not depict the person (e.g., background portions). The body segmentation is used to distinguish the person depicted in the image from other objects or elements depicted in the image. In some implementations, the AR/VR application continuously captures images of the person in real time or periodically to continuously or periodically update the applied one or more visual effects. This allows the user to move around in the real world and see the one or more visual effects update in real time.

In order for the AR/VR application to apply the one or more visual effects directly from a captured RGB image, the AR/VR application obtains a trained machine learning technique from the surface normal tensor control system 224. The trained machine learning technique processes the captured RGB image to generate a segmentation and surface normal tensor from the captured image that corresponds to the person depicted in the captured RGB image.

In training, the surface normal tensor control system 224 obtains a first plurality of input training images that include a training portion representing a person depicted in an image and a corresponding ground-truth surface normal tensor. A machine learning technique (or machine learning model) (e.g., a deep neural network) is trained based on features of the plurality of training images. Specifically, the machine learning technique extracts one or more features from a given training image and estimates (predicts) a segmentation and surface normal tensor for the body depicted in the given training image. The machine learning technique obtains the ground truth information corresponding to the training image and adjusts or updates one or more coefficients or parameters to improve subsequent estimations of segmentations and surface normal tensors of the person depicted in the image.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization), interested-based, or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, and settings (e.g., notification and privacy settings), as well as a user-selected avatar representation (or collection of such avatar representations). A particular user may then selectively include one or more of these avatar representations within the content of messages communicated via the messaging system 100 and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes AR content items (e.g., corresponding to applying AR experiences). An AR content item or AR item may be a real-time special effect and sound that may be added to an image or a video.

As described above, augmentation data includes AR content items, overlays, image transformations, AR images, AR logos or emblems, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple AR content items, a user can use a single video clip with multiple AR content items to see how the different AR content items will modify the stored clip. For example, multiple AR content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different AR content items will look within different windows in a display at the same time. This can, for example, enable multiple windows with different pseudorandom animations to be viewed on a display at the same time.

Data and various systems using AR content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a 3D mesh model of the object or objects and using transformations and animated textures of the model within the video to achieve the transformation. In other examples, tracking of points on an object may be used to place an image or texture (which may be 2D or 3D) at the tracked position. In still further examples, neural network analysis of video frames may be used to place images, models, or textures in content (e.g., images or frames of video). AR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh and then various areas based on the points are generated. The elements of the object are then tracked by aligning the area for each element with a position for each of the at least one elements, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an ASM algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Trained machine learning technique(s) 307 stores parameters that have been trained during training of the surface normal tensor control system 224. For example, trained machine learning techniques 307 stores the trained parameters of one or more neural network machine learning techniques.

Training images 309 stores a plurality of images that each include a training portion representing a person depicted in an image and a corresponding ground-truth surface normal tensor. The plurality of images stored in the training images 309 includes various depictions of one or more users wearing different garments together with segmentations of the garments that indicate which pixels in the images correspond to the garments and the corresponding surface normal tensors of the training portions that depict the bodies. These training images 309 are used by the surface normal tensor control system 224 to train the machine learning technique, as discussed above and below. In some cases, the training images 309 include a plurality of image resolutions of bodies depicted in the images. The training images 309 can include labeled and unlabeled image and video data. The training images 309 can include a depiction of a whole body of a particular user, an image that lacks a depiction of any user (e.g., a negative image), a depiction of a plurality of users wearing different garments, and depictions of users wearing garments at different distances from an image capture device.

Data Communications Architecture

Figure 4:
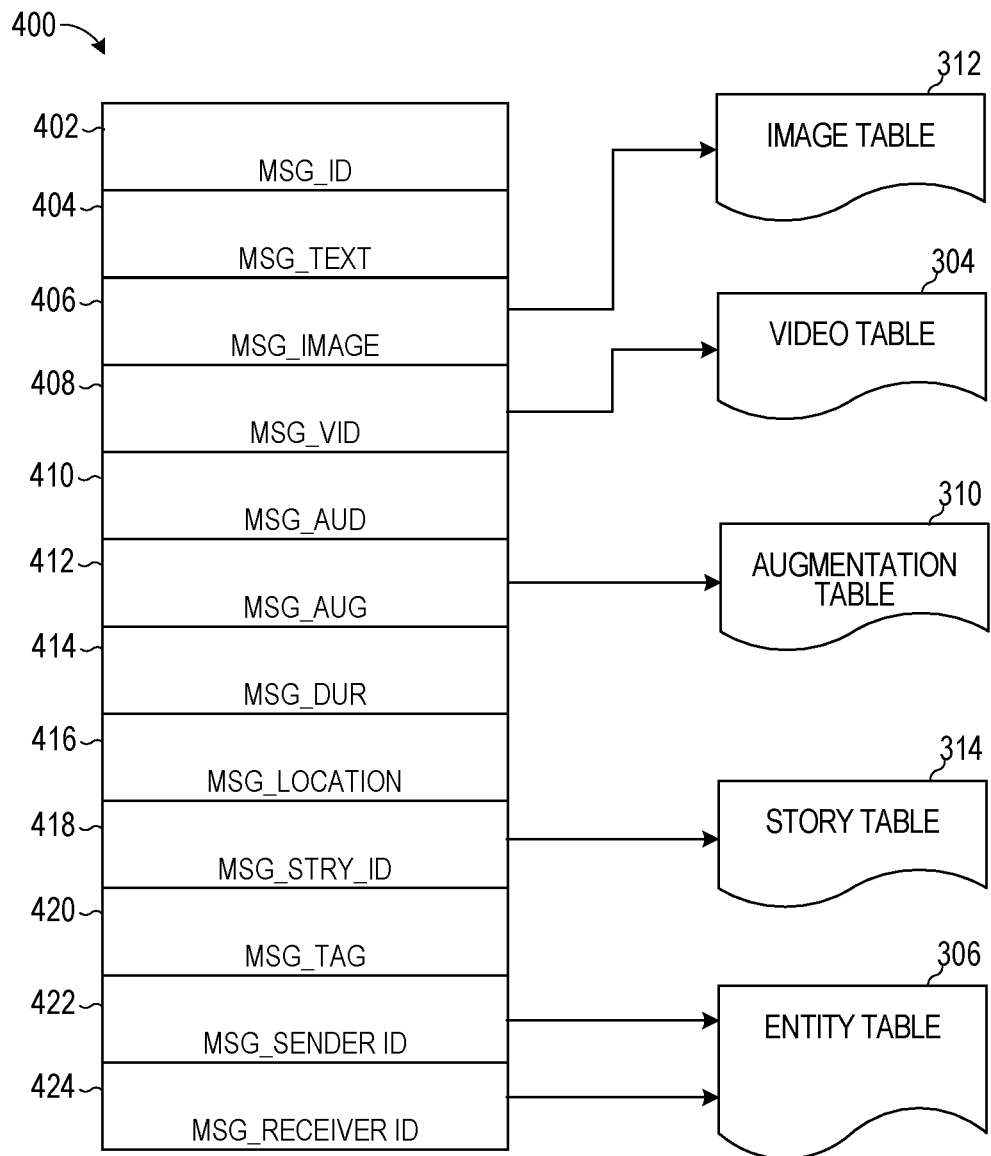
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Surface Normal Tensor Control System

Figure 5:
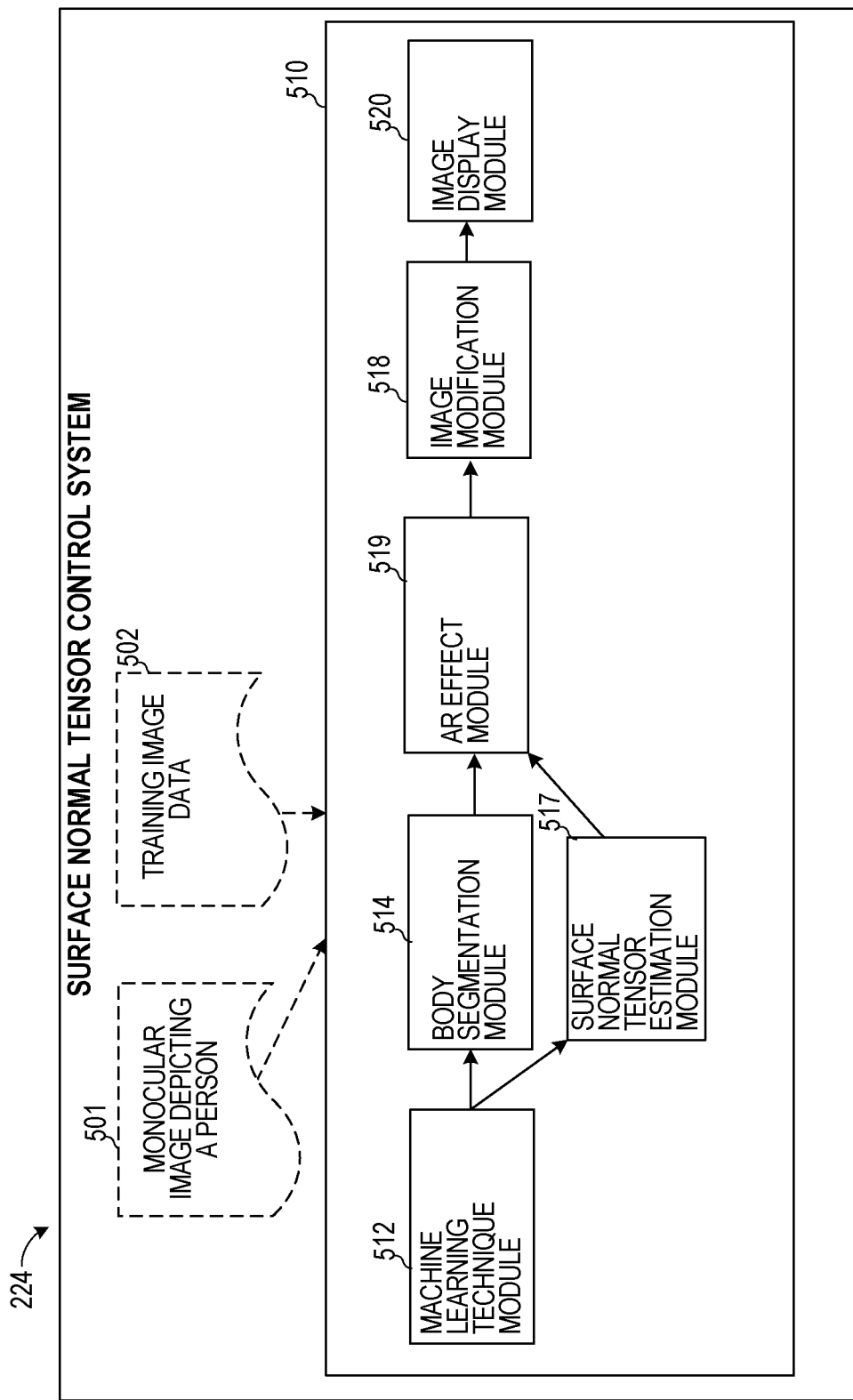
FIG. 5 is a block diagram showing an example surface normal tensor control system, according to some examples.

FIG. 5 is a block diagram showing an example surface normal tensor control system 224, according to some examples. Surface normal tensor control system 224 includes a set of components 510 that operate on a set of input data (e.g., a monocular image 501 depicting a real body of a person and training image data 502). The set of input data is obtained from training images 309 stored in database(s) (FIG. 3) during the training phases and is obtained from an RGB camera of a client device 102 when an AR/VR application is being used, such as by a messaging client 104. Surface normal tensor control system 224 includes a machine learning technique module 512, an body segmentation module 514, a surface normal tensor estimation module 517, an AR effect module 519, image modification module 518, and an image display module 520.

During training, the surface normal tensor control system 224 receives a given training image or video (e.g., monocular image 501 depicting a real body of a person, such as an image of a user wearing as a shirt (short sleeve, t-shirt, or long sleeve), jacket, tank top, sweater, and so forth, a lower body garment, such as pants or a skirt, a whole body garment, such as a dress or overcoat, or any suitable combination thereof or depicting multiple users simultaneously wearing respective combinations of upper body garments, lower body garments, or whole body garments from training image data 502. The surface normal tensor control system 224 crops out an image portion that includes the real body of the person. The surface normal tensor control system 224 applies one or more machine learning techniques using the machine learning technique module 512 on the given training image or video portion that has been cropped out.

The machine learning technique module 512 extracts one or more features from the given training image or video to estimate a segmentation of the person depicted in the image (e.g., generates a segmentation vector) concurrently with a surface normal tensor of the person. For example, the segmentation of the body identifies which pixels in the image correspond to the body of the user and which pixels correspond to a background. Namely, the segmentation output by the machine learning technique module 512 identifies borders of a body of the user in the given training image. The surface normal tensor provides the pixel angle directions or the surface normals of each pixel of the body of the person depicted in the image.

The machine learning technique module 512 retrieves the ground truth surface normal tensor associated with the given training image or video. The machine learning technique module 512 compares the estimated surface normal tensor of the person with the ground truth garment surface normal tensor provided as part of the training image data 502. Based on a difference threshold or deviation of the comparison, the machine learning technique module 512 updates one or more coefficients or parameters and obtains one or more additional training images or videos. After a specified number of epochs or batches of training images have been processed and/or when the difference threshold or deviation reaches a specified value, the machine learning technique module 512 completes training and the parameters and coefficients of the machine learning technique module 512 are stored in the trained machine learning technique(s) 307.

The body segmentation generated by the machine learning technique module 512 is provided to the body segmentation module 514. The body segmentation module 514 can select or identify a set of pixels in the image that correspond to the body of the person based on the body segmentation received from the machine learning technique module 512.

The body segmentation module 514 is used to track a 2D or 3D position of the body in subsequent frames of a video. This enables one or more AR elements to be displayed on the body and be maintained at their respective positions as the body moves around the screen. In this way, the body segmentation module 514 can determine and track which portions of the body are currently shown in the image that depicts the person and to selectively adjust the corresponding AR elements that are displayed.

The surface normal tensor estimation module 517 receives a surface normal tensor from the machine learning technique module 512. The surface normal tensor estimation module 517 can specify the pixel directions or the surface normals of each pixel in the portion of the image that is identified by the body segmentation module 514 as corresponding to the body depicted in the image. In this way, the outputs of both the body segmentation module 514 and the surface normal tensor estimation module 517 can be used to uniquely and specifically determine the surface normals of each pixel that corresponds to the body depicted in the image. This enables the AR effect module 519 to selectively apply a given set of AR elements to the body depicted in the image without modifying any other portion of the image (e.g., the background). Also, based on the outputs of both the body segmentation module 514 and the surface normal tensor estimation module 517, the AR effect module 519 can apply an AR element to a portion of the body for which the surface normals are available for presentation and when that particular portion of the body is no longer visible, the AR effect module 519 can remove the applied AR element.

After training, surface normal tensor control system 224 receives an input image 501 (e.g., monocular image depicting a person) as a single RGB image from a client device 102. The surface normal tensor control system 224 generates a segmentation of the data representing the person depicted in the image. The surface normal tensor control system 224 extracts a portion of the image corresponding to the segmentation of the data representing the person depicted in the image. The surface normal tensor control system 224 applies a machine learning model to the portion of the image to predict a surface normal tensor for the data representing the depiction of the person, the surface normal tensor representing surface normals of each pixel within the portion of the image. The surface normal tensor control system 224 applies one or more AR elements to the image based on the surface normal tensor.

In some examples, the surface normal tensor control system 224 determines that light is being focused on the data representing the depiction of the person from a first direction based on the surface normal tensor. The surface normal tensor control system 224 modifies pixel values of the portion of the image corresponding to the segmentation of the data representing the depiction of the person to re-focus the light on the depiction of the person from a second direction, wherein the pixel values are modified without modifying pixel values of portions of the image outside of the segmentation. In some examples, the surface normal tensor control system 224 applies the one or more AR elements based on a geometry of a body of the person, hair of the person, clothing of the person, and one or more accessories worn by the person. In some examples, the surface normal tensor control system 224 applies artificial light to the data representing the person depicted in the image based on the surface normal tensor.

In some examples, the surface normal tensor control system 224 displays the one or more AR elements on a first portion of the data representing the person depicted in a first frame of a video, wherein the person is positioned at a first location in the first frame. The surface normal tensor control system 224 determines that the person has moved from the first location to a second location in a second frame of the video and update a display position of the one or more AR elements in the second frame to maintain the display of the one or more AR elements on the data representing the person depicted in the image based on the surface normal tensor.

In some examples, the surface normal tensor control system 224 replaces data representing a depiction of the person with one or more visual effects. In such cases, the surface normal tensor control system 224 determines light reflection directions on the person based on the surface normal tensor and causes the one or more visual effects to reflect light along the light reflection directions using the surface normal tensor. For example, the surface normal tensor control system 224 recolors one or more portions of the person depicted in the image. For example, the surface normal tensor control system 224 applies one or more animated fashion items to the person depicted in the image based on the surface normal tensor.

In some examples, the surface normal tensor control system 224 determines a first direction of a first pixel corresponding to the data representing a depiction of a person. The surface normal tensor control system 224 determines a second direction of a second pixel corresponding to the data representing a depiction of a person. The surface normal tensor control system 224 generates, for display, a first AR element that includes a 3D graphic (e.g., a 3D column or bar) that extends from the first pixel along the first direction. The surface normal tensor control system 224 generates, for display together with the first AR element, a second AR element that includes a 3D graphic (e.g., another identical 3D column or bar) that extends from the second pixel along the second direction.

In some examples, the surface normal tensor control system 224 detects one or more wrinkles of clothing worn by the person depicted in the image based on the surface normal tensor. In such cases, the surface normal tensor control system 224 renders one or more virtual shadows on the clothing based on the one or more wrinkles. For example, the surface normal tensor control system 224 bends a portion of the one or more AR elements that overlays the one or more wrinkles based on the surface normal tensor.

The surface normal tensor estimation module 517 is trained to generate or extract values indicating the pixel direction or angle relative to a camera used to capture the image or video depicting the image portion corresponding to the person or user depicted in the image. The angle relative to the camera can in some cases be represented as a normal vector or normal direction of a given pixel. For example, the surface normal tensor estimation module 517 can determine, for a given pixel, the direction to which the pixel points relative to a surface normal of a camera that captures the image that includes the pixel. This direction can be associated with the pixel by storing the direction in a vector that includes or defines an x, y, z component in a red, green and blue (RGB) channel of each pixel. This can be referred to as the normal map. Namely, each pixel can be represented by an RGB channel that defines the amount of red, green and blue color to associate with the pixel, such as the red, green and blue pixel values for each pixel. This RGB channel can also be associated with a vector that defines the pixel or normal direction of each pixel in the x, y, z coordinate or UV space. In this way, each pixel can include red, green and blue values as well as x, y and z coordinates.

For example, if the pixel is on a left shirt sleeve and the person wearing the shirt is turned left relative to the camera, the pixel angle can be 45 degrees or −45 degrees (or any other suitable angle even an angle that is not facing from the camera) relative to a surface normal of the camera. A larger pixel angle indicates that the portion of the person represented by the corresponding pixel is turned further right/left relative to the camera. The pixel angle can be one-dimensional and/or 2D. In case of being 2D, the pixel angle represents how much the person is turned left/right relative to the camera and also how far up/down the portion of the fashion item is pointing. The surface normal tensor estimation module 517 generates a matrix representing the one-dimensional, 2D pixel angle, and/or 3D pixel angle for each pixel in the portion of the image corresponding to the person depicted in the image or video. The pixel angle can be represented by a 3D normal vector or 2D normal vector and stored in the RGB channel of each pixel. In some cases, the surface normal tensor estimation module 517 generates the values independently from movement or tracking information.

A user of the AR/VR application may be presented with an option to select an AR application or experience to control display of AR elements on the user, such as to re-focus light from a different direction (e.g., to apply artificial or AR light to the person), to generate columns or 3D elements extending from groups of pixels on the person depicted in the image or video, generate shadows on the person based on wrinkles that are determined based on a surface normal tensor, recolor one or more portions of the person, and so forth. In response to receiving a user selection of the option, a camera (e.g., front-facing or rear-facing camera) is activated to begin capturing an image or video of the user. The image or video depicting the user is provided to the AR effect module 519 to apply one or more AR elements to the person depicted in the image or video in accordance with the selected option (e.g., re-focus light from a different direction (e.g., to apply artificial or AR light to the person), to generate columns or 3D elements extending from groups of pixels on the person depicted in the image or video, generate shadows on the person based on wrinkles that are determined based on a surface normal tensor, recolor one or more portions of the person). The AR effect module 519 selects between various applications/modifications of AR elements displayed on the user, such as based on gestures or movement of the user and applies such AR elements based on a body segmentation and surface normal tensor estimation provided by the machine learning technique module 512.

The image modification module 518 can adjust the image captured by the camera based on the AR effect selected by the AR effect module 519. The image modification module 518 adjusts the way in which the user is/are presented in an image or video, such as by changing the color or occlusion pattern of the lights and shadows cast on the user based on the body segmentation and surface normal tensor of the person and applying one or more AR elements to the person depicted in the image or video. Image display module 520 combines the adjustments made by the image modification module 518 into the received monocular image or video depicting the user's body. The image or video is provided by the image display module 520 to the client device 102 and can then be sent to another user or stored for later access and display.

Figure 6:
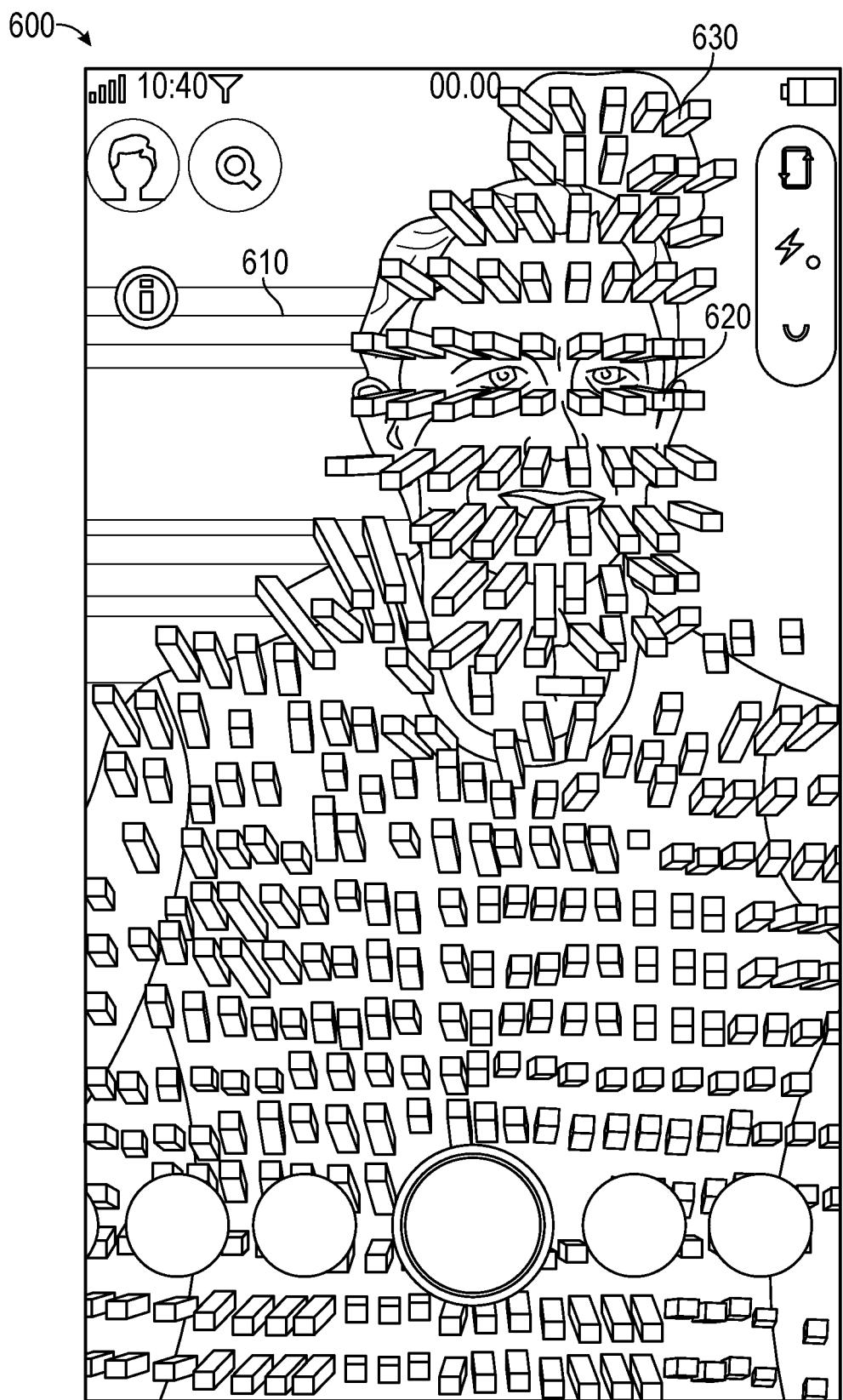
FIGS. 6, 7, and 8 are diagrammatic representations of outputs of the surface normal tensor control system, in accordance with some examples.
Figure 7:
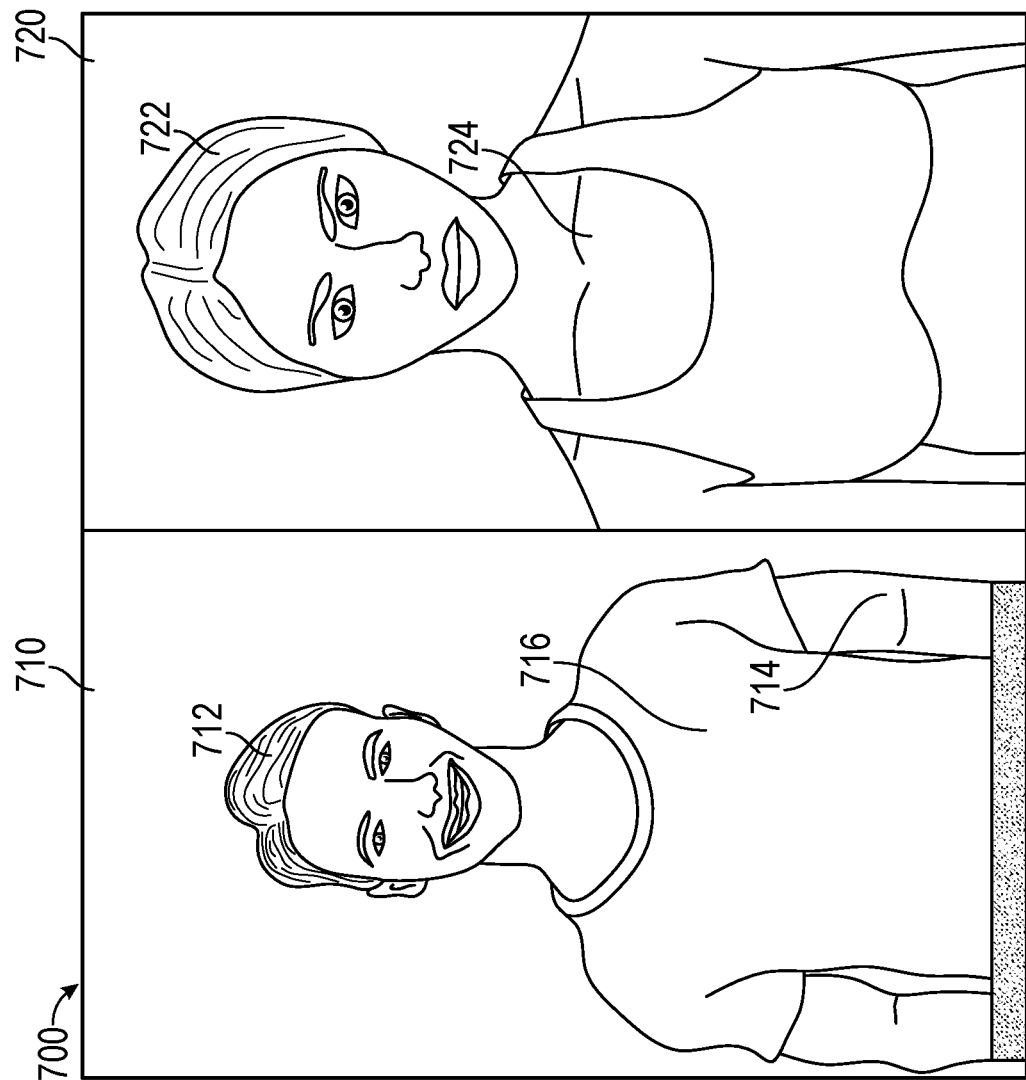
Figure 8:
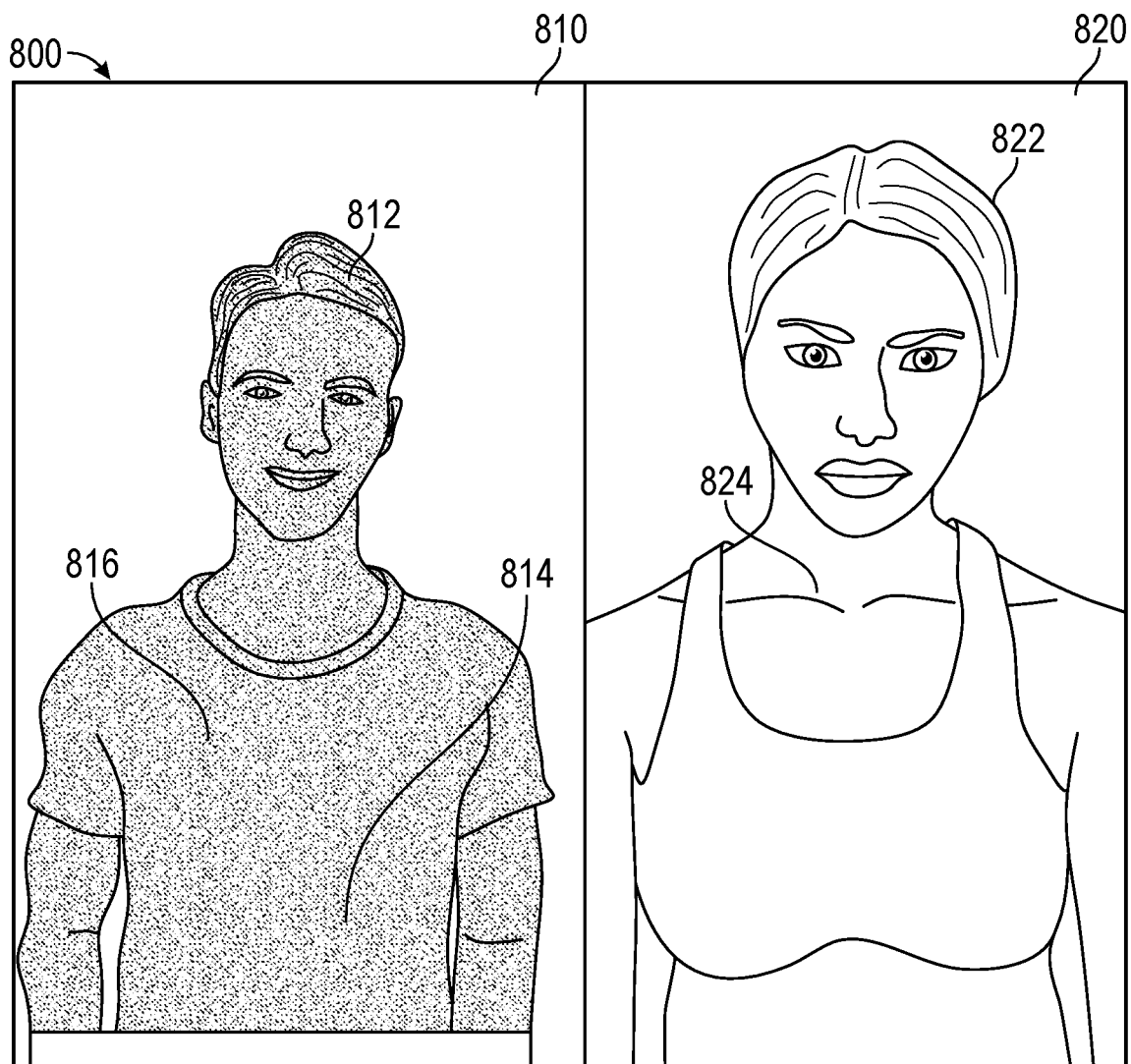

FIGS. 6-8 show illustrative outputs of one or more of the visual effects that can be selected and applied by the AR effect module 519. For example, as shown in FIG. 6, input from a user may be received selecting a set of 3D AR graphical elements (e.g., a 3D column or 3D bar). In response, the surface normal tensor control system 224 generates a user interface 600 in which a real-time video 610 is presented. The real-time video 610 may include a video captured and received from a front-facing or rear-facing camera of the client device 102. The real-time video 610 may include a depiction of a person 620.

The AR effect module 519 can generate a 3D graphic as the AR elements that appears to extend from each group of pixels of person 620 depicted in the video 610. The 3D graphic can be associated with a group of pixels having a certain quantity of pixels (e.g., 100 pixels). For example, a group of pixels that are within a specified region (e.g., a square region or circular region having a certain size) can be associated with each respective 3D graphic of multiple identical (or different) 3D graphics. The AR effect module 519 can identify a first group of pixels that are within a first portion of the segmentation of the body of the person 620 depicted in the video 610. The AR effect module 519 can obtain the surface normal tensor for that first group of pixels and can generate an average (or some other representative) surface normal that represents the average of the surface normals of the first group of pixels.

The AR effect module 519 can then retrieve a first 3D AR graphic 630 (e.g., a first AR 3D column) and align the first AR 3D graphic 630 on top of the first group of pixels and angle the first AR 3D graphic along the average of the surface normals of that first group of pixels. This makes the first AR 3D graphic 630 appear to be extending from the first group of pixels corresponding to the first portion of the segmentation of the body of the person 620. The AR effect module 519 can perform a similar operation for a second group of pixels that are within a second portion of the segmentation to generate a second AR 3D graphic for display on top of the second group of pixels. This process can be repeated until all of the pixel groups within the segmentation of the body are associated with respective AR 3D graphics. The AR 3D graphics change their positions and orientations as the person 620 moves around in subsequent frames and the surface normals of the respective groups of pixels are updated.

Other portions of the video 610 (e.g., a background) that fall outside of the segmentation of the person 620 are not modified or affected by the displayed AR 3D graphics. In this way, the AR 3D graphics are only displayed on pixels corresponding to the body of the person 620 that is depicted in the image or video and not on any other portion.

In some examples, as shown in FIG. 7, input from a user may be received selecting an option to adjust a color properties of pixels of a person depicted in an image or video and/or to adjust shadows or light reflections and absorptions by the person depicted in the image or video. In response, the surface normal tensor control system 224 generates a user interface 700 in which a real-time video 710 is presented. The real-time video 710 may include a video captured and received from a front-facing or rear-facing camera of the client device 102. The real-time video 710 may include a depiction of a person 712.

The AR effect module 519 can apply a first set of color modifications to a first region 716 that corresponds to or is based on the surface normals of the pixels in the first region 716. A second set of color modifications can be applied to a second region 714 that corresponds to or is based on the surface normals of the pixels in the second region 714. Namely, the surface normals of the pixels in the first region 716 may be within a first threshold or first set of boundaries.

In response, the AR effect module 519 selects and applies the first set of color modifications to the first region 716. Also, the surface normals of the pixels in the second region 714 may be within a second threshold or second set of boundaries that differ from the first threshold or first set of boundaries. In response, the AR effect module 519 selects and applies the second set of color modifications to the first region 716. The first set of color modifications can be associated with the first set of boundaries or first threshold and the second set of color modifications can be associated with the second set of boundaries of second threshold. Other portions of the video 710 (e.g., a background) that fall outside of the segmentation of the person 712 are not modified or affected by the color modifications. In this way, the color modifications are only displayed on pixels corresponding to the body of the person 710 that is depicted in the image or video and not on any other portion.

In some cases, the person 712 can move around in the video. For example, as shown in FIG. 8, the person 712 has moved to a new position which results in an adjustment of change to the surface normals of the pixels of the body of the person. Namely, as shown in FIG. 8, a user interface 800 is presented in which a video 810 depicts the person 812 (which can be the same person 712 as in FIG. 7 but in a new position). Now, the AR effect module 519 can apply a third set of color modifications to the first region 816 (corresponding previously to the first region 716) that corresponds to or is based on the surface normals of the pixels in the first region 816. A fourth set of color modifications can be applied to a second region 814 (corresponding previously to the second region 714) that corresponds to or is based on the surface normals of the pixels in the second region 714.

In some cases, the person 712 in FIG. 7 remains in the same position but a new color modification is selected. The new color modification specifies different sets of color modifications to be applied to pixels in different boundaries (ranges) or thresholds. In such cases, as shown in FIG. 8, a user interface 800 is presented in which a video 810 depicts the person 812 (which can be the same person 712 as in FIG. 7). Now, the AR effect module 519 can apply a third set of color modifications to the first region 816 (corresponding previously to the first region 716) that corresponds to or is based on the surface normals of the pixels in the first region 816. A fourth set of color modifications can be applied to a second region 814 (corresponding previously to the second region 714) that corresponds to or is based on the surface normals of the pixels in the second region 714. For example, input from the user can be received to reduce a size of the boundaries for specific sets of color modifications relative to those shown in FIG. 7. In such cases, the same sets of pixels that had surface normals that were within the thresholds or boundaries may no longer be within the thresholds or boundaries. As a result, the pixels can remain unmodified or different sets of colors can be applied to such pixels.

In some examples, the surface normal tensor control system 224 generates a user interface 800 in which a real-time video 720 is presented. The real-time video 720 may include a video captured and received from a front-facing or rear-facing camera of the client device 102. The real-time video 720 may include a depiction of a person 722.

The AR effect module 519 can apply a first brightness or generate a first set of shadows in a region 724 that corresponds to or is based on the surface normals of the pixels in the region 724. Namely, light (artificial or real) can be projected on the person 722 from a particular angle. The shadows can be cast or rendered artificially on the person 722 (e.g., on the clothing of the person) based on the surface normals of the pixels in the region 724. In some cases, a wrinkle may be present on the clothing of the person 724. The wrinkle can result in a set of surface normals that indicate the direction along which light is absorbed or reflected and can be used to render the shadows on the person 722 or the clothing of the person 722 depicted in the video 720. As the person moves around in the video, the light can remain cast from the same but the shadows that are generated can be adjusted as the surface normals of the pixels in that region change.

In some cases, input can be received from a user that (adjusts) increases the amount of (artificial or real) light or decreases the amount of light cast on the person 722. Based on the adjustment to the amount of light, the shadows cast on the person can be increased or decreased. For example, as shown in FIG. 8, a user interface 800 is presented in which a video 820 depicts the person 822 (which can be the same person 722 as in FIG. 7). Now, the AR effect module 519 can apply a different amount of shadows to the region 824 (corresponding previously to the region 724) reflecting the adjustments to the amount of light.

In some examples, an AR element can be used to completely replace the depiction of the person in the image or a portion of the person (e.g., one or more articles of clothing). The AR element can be animated and can be a 2D element or 3D element. The AR element can be overlaid on top of clothing worn by the user. A portion of the AR element can be twisted or bent in a region of the clothing that has a crease or wrinkle. This makes it appear as though the AR element is actually part of the clothing worn by the person depicted in the image. Specifically, the AR element can be overlaid and bent or twisted in a way that results in the surface normals of the AR element mirroring, copying or corresponding to the respective surface normals of the pixels over which the AR element is overlaid.

Figure 9:
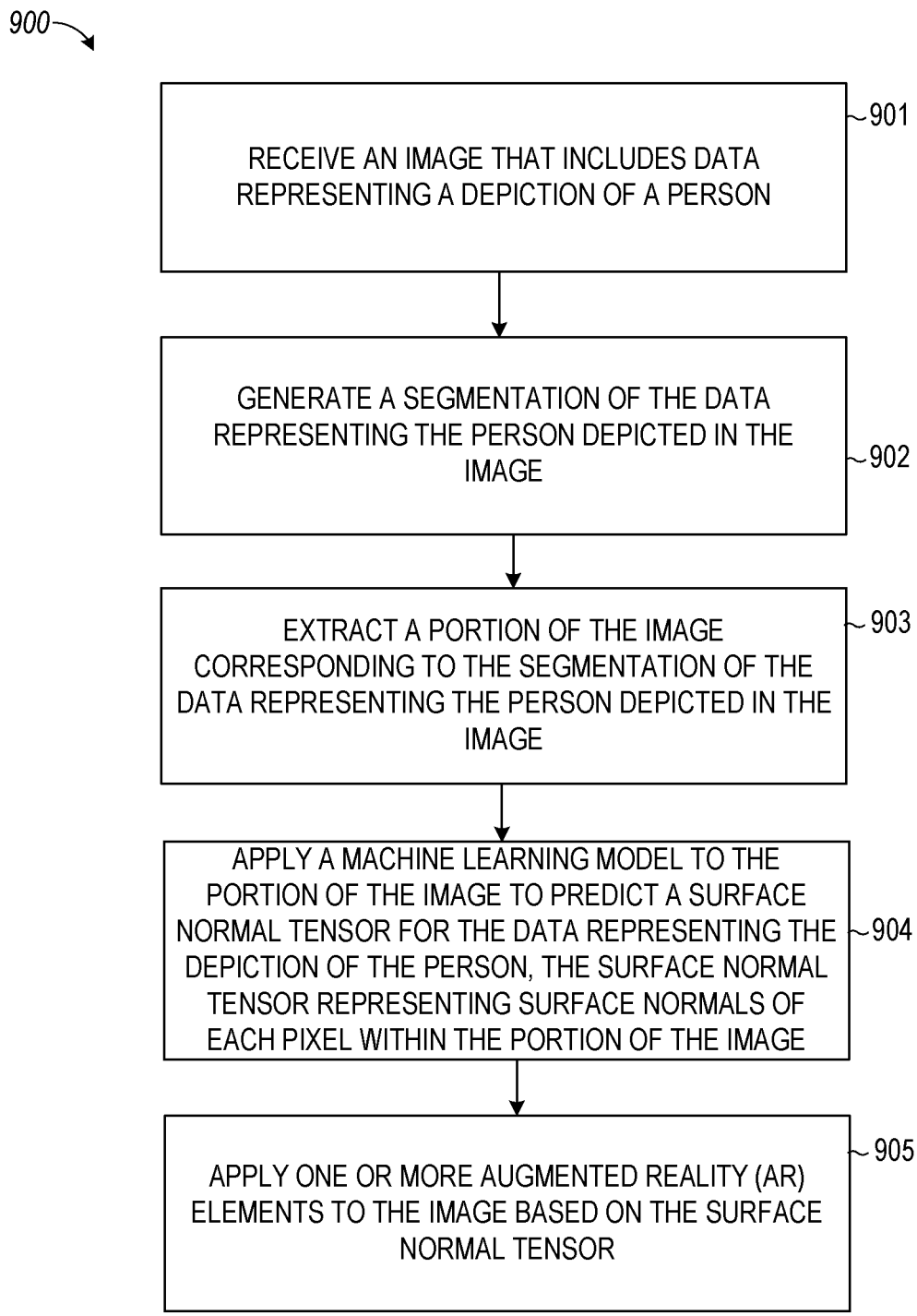
FIG. 9 is a flowchart illustrating example operations of the surface normal tensor control system, according to some examples.

FIG. 9 is a flowchart of a process 900 performed by the surface normal tensor control system 224, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, the surface normal tensor control system 224 (e.g., a client device 102 or a server) receives an image that includes a depiction of a person, as discussed above.

At operation 902, the surface normal tensor control system 224 generates a segmentation of the data representing the person depicted in the image, as discussed above.

At operation 903, the surface normal tensor control system 224 extracts a portion of the image corresponding to the segmentation of the data representing the person depicted in the image, as discussed above.

At operation 904, the surface normal tensor control system 224 applies a machine learning model to the portion of the image to predict a surface normal tensor for the data representing the depiction of the person, the surface normal tensor representing surface normals of each pixel within the portion of the image, as discussed above.

At operation 905, the surface normal tensor control system 224 applies one or more augmented reality (AR) elements to the image based on the surface normal tensor e, as discussed above.

Machine Architecture

Figure 10:
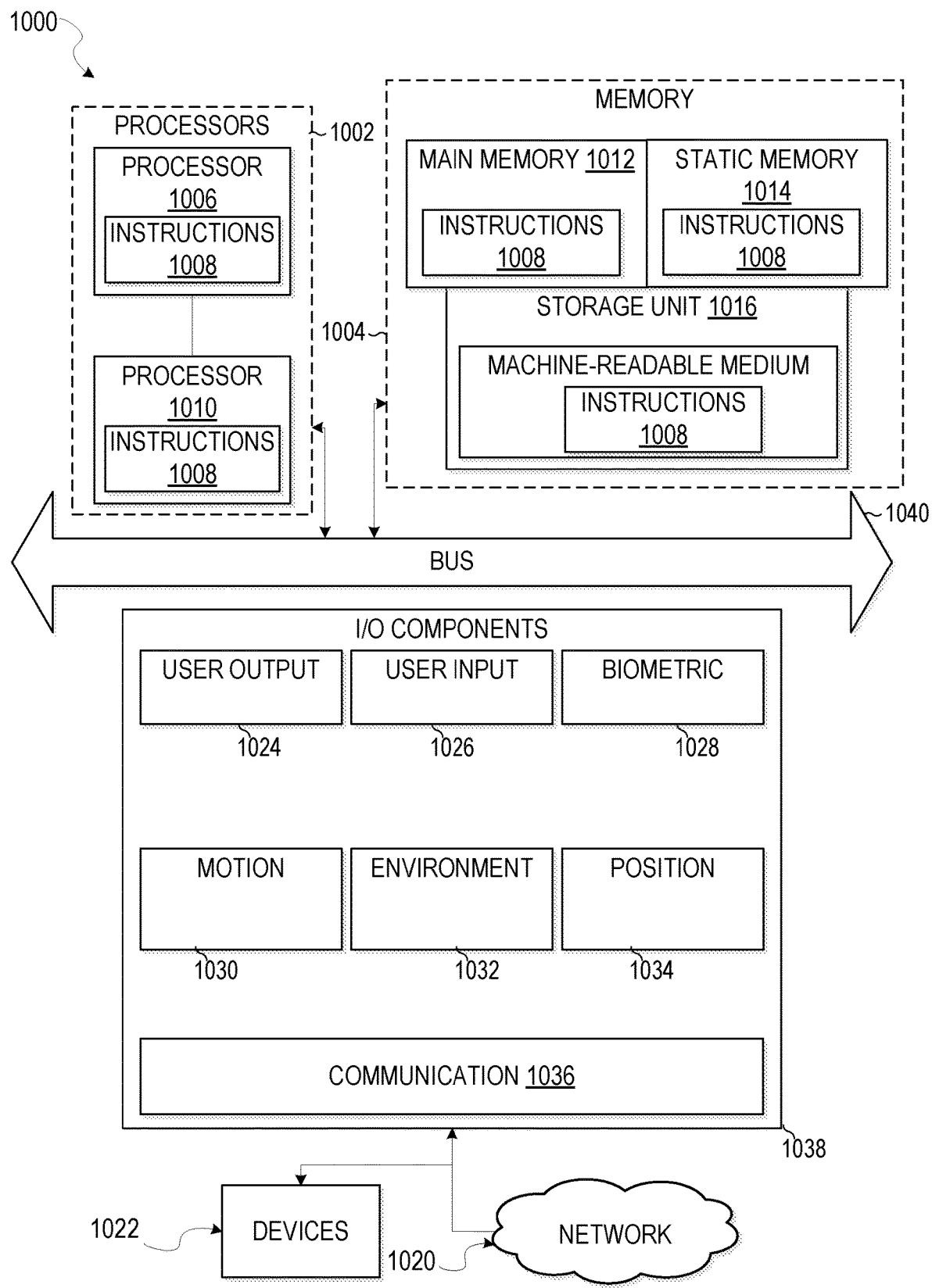
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1004, the static memory 1014, and the storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, and rotation sensor components (e.g., gyroscope).

The environmental components 1032 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad, or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., HTTP). Similarly, the instructions 1008 may be transmitted or received using a transmission medium via a coupling (e.g., a peer-to-peer coupling) to the devices 1022.

Software Architecture

Figure 11:
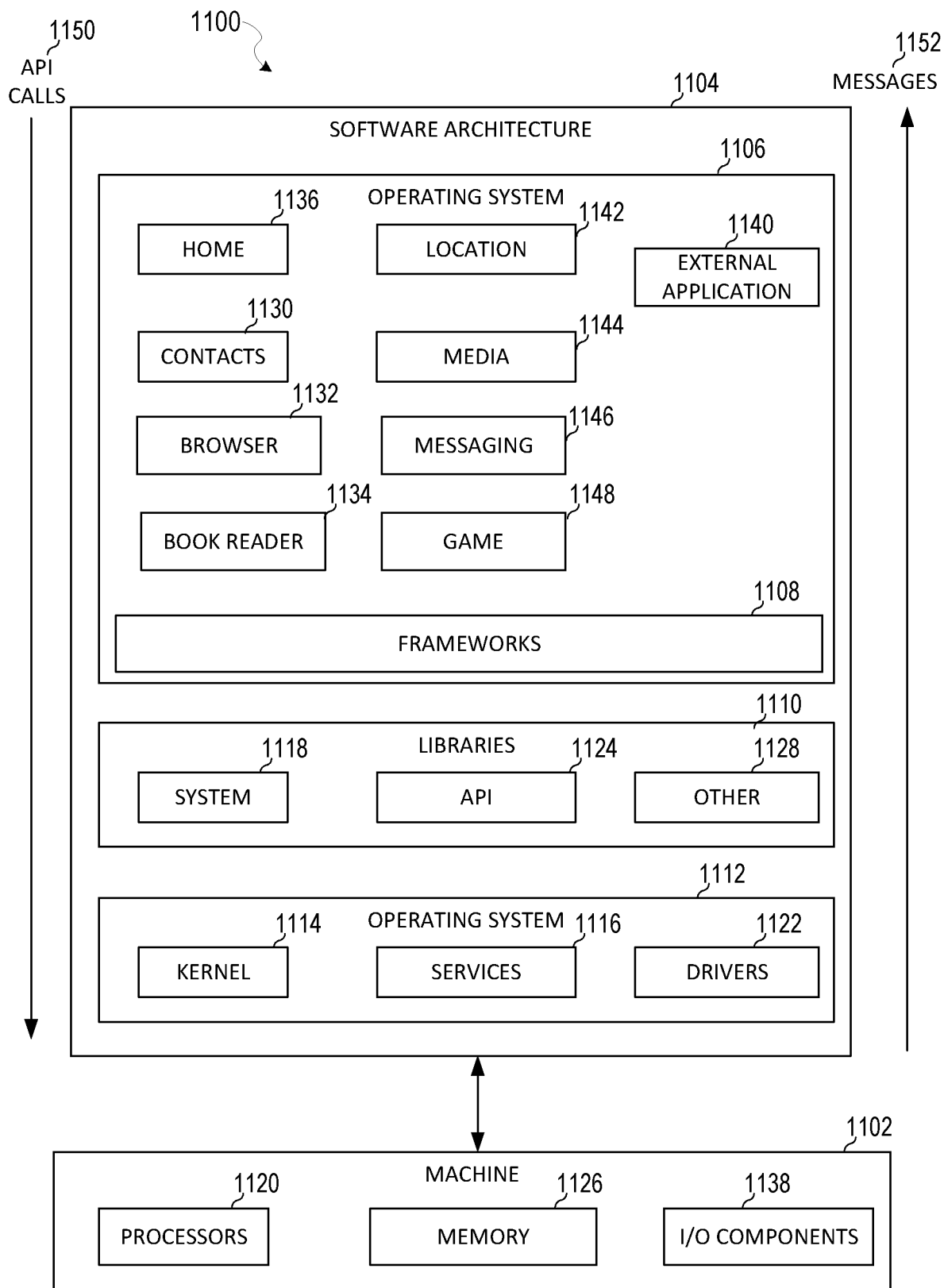
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionalities. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as an external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the external application 1140 can invoke the API calls 1150 provided by the operating system 1112 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistant (PDA), smartphone, tablet, ultrabook, netbook, laptop, multi-processor system, microprocessor-based or programmable consumer electronics, game console, set-top box, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1002 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," and "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
   receiving, by one or more processors of a client device, an image that includes data representing a depiction of a person;
   generating, by the one or more processors, a segmentation of the data representing the depiction of the person;
   extracting a portion of the image corresponding to the segmentation of the data representing the person depicted in the image;
   applying a machine learning model to the portion of the image to predict a surface normal tensor for the data representing the depiction of the person, the surface normal tensor representing surface normals of each pixel within the portion of the image; and
   applying one or more augmented reality (AR) elements to the image based on the surface normal tensor.

2. The method of claim 1, wherein applying the one or more AR elements comprises:
   determining that light is being focused on the data representing the depiction of the person from a first direction based on the surface normal tensor; and
   modifying pixel values of the portion of the image corresponding to the segmentation of the data representing the depiction of the person to re-focus the light on the depiction of the person from a second direction, wherein the pixel values are modified without modifying pixel values of portions of the image outside of the segmentation.

3. The method of claim 1, wherein applying the one or more AR elements comprises applying the one or more AR elements based on a geometry of a body of the person, hair of the person, clothing of the person, and one or more accessories worn by the person.

4. The method of claim 1, wherein applying the one or more AR elements comprises applying artificial light to the data representing the person depicted in the image based on the surface normal tensor.

5. The method of claim 1, further comprising:
   displaying the one or more AR elements on a first portion of the data representing the person depicted in a first frame of a video, wherein the person is positioned at a first location in the first frame;
   determining that the person has moved from the first location to a second location in a second frame of the video; and
   updating a display position of the one or more AR elements in the second frame to maintain the display of the one or more AR elements on the data representing the person depicted in the image based on the surface normal tensor.

6. The method of claim 1, wherein the surface normal tensor is computed relative to a surface normal of a camera used to capture the image.

7. The method of claim 1, wherein the AR elements are applied to a real-time video feed comprising the image.

8. The method of claim 1, wherein applying the one or more AR elements comprises replacing data representing a depiction of the person with one or more visual effects, further comprising:
   determining light reflection directions on the person based on the surface normal tensor; and
   causing the one or more visual effects to reflect light along the light reflection directions using the surface normal tensor.

9. The method of claim 8, wherein applying the one or more AR elements comprises recoloring one or more portions of the person depicted in the image.

10. The method of claim 1, wherein applying the one or more AR elements comprises applying one or more animated fashion items to the person depicted in the image based on the surface normal tensor.

11. The method of claim 1, wherein applying the one or more AR elements comprises:
   determining a first direction of a first pixel corresponding to the data representing a depiction of a person;
   determining a second direction of a second pixel corresponding to the data representing a depiction of a person;
   generating, for display, a first AR element comprising a three-dimensional (3D) graphic that extends from the first pixel along the first direction; and
   generating, for display together with the first AR element, a second AR element comprising a 3D graphic that extends from the second pixel along the second direction.

12. The method of claim 11, wherein the 3D graphic that extends from the first pixel comprises a 3D column.

13. The method of claim 1, wherein the machine learning model comprises a neural network, the neural network being trained to establish a relationship between image portions depicting different orientations of human bodies and surface normal directions of pixels of the human bodies.

14. The method of claim 13, further comprising training the machine learning model by performing operations comprising:
receiving a plurality of training data sets, each of the plurality of training data sets comprising a training portion representing a person depicted in an image and a corresponding ground-truth surface normal tensor;
applying the machine learning model to a first training portion of a first training data set to predict an estimated surface normal tensor;
computing a deviation between the estimated surface normal tensor and the ground-truth surface normal tensor associated with the first training portion;
updating one or more parameters of the machine learning model based on the computed deviation.

15. The method of claim 1, further comprising:
detecting one or more wrinkles of clothing worn by the person depicted in the image based on the surface normal tensor.

16. The method of claim 15, wherein applying the one or more AR elements comprises rendering one or more virtual shadows on the clothing based on the one or more wrinkles.

17. The method of claim 15, wherein applying the one or more AR elements comprises bending a portion of the one or more AR elements that overlays the one or more wrinkles based on the surface normal tensor.

18. The method of claim 1, wherein the machine learning model generates a segmentation vector that associates each pixel in the image with an indication of whether the pixel corresponds to a background or the data representing the depiction of the person, the one or more AR elements being applied further based on the segmentation vector.

19. A system comprising:
a processor of a client device; and
a memory component having instructions stored thereon that, when executed by the processor, cause the processor to perform operations comprising:
receiving an image that includes data representing a depiction of a person;
generating a segmentation of the data representing the person depicted in the image;
extracting a portion of the image corresponding to the segmentation of the data representing the person depicted in the image;
applying a machine learning model to the portion of the image to predict a surface normal tensor for the data representing the depiction of the person, the surface normal tensor representing surface normals of each pixel within the portion of the image; and
applying one or more augmented reality (AR) elements to the image based on the surface normal tensor.

20. A non-transitory computer-readable storage medium having stored thereon instructions that, when executed by a processor of a client device, cause the processor to perform operations comprising:
receiving an image that includes data representing a depiction of a person;
generating a segmentation of the data representing the person depicted in the image;
extracting a portion of the image corresponding to the segmentation of the data representing the person depicted in the image;
applying a machine learning model to the portion of the image to predict a surface normal tensor for the data representing the depiction of the person, the surface normal tensor representing surface normals of each pixel within the portion of the image; and
applying one or more augmented reality (AR) elements to the image based on the surface normal tensor.

* * * * *